(12) United States Patent
Charania et al.

(10) Patent No.: US 8,839,277 B2
(45) Date of Patent: Sep. 16, 2014

(54) REVENUE MANAGEMENT FOR DYNAMIC BUNDLING

(75) Inventors: Aamer Charania, Flower Mound, TX (US); Syed Zafar Beyabani, Irving, TX (US); Yuriy Bolyukh, Trophy Club, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 305 days.

(21) Appl. No.: 12/366,928

(22) Filed: Feb. 6, 2009

(65) Prior Publication Data
US 2010/0205641 A1 Aug. 12, 2010

(51) Int. Cl.
*H04N 7/16* (2011.01)
*H04N 7/173* (2011.01)
*H04N 21/658* (2011.01)
*H04N 21/2543* (2011.01)
*G06Q 30/02* (2012.01)
*H04N 21/442* (2011.01)
*H04N 21/258* (2011.01)

(52) U.S. Cl.
CPC ....... *H04N 21/2543* (2013.01); *H04N 21/6582* (2013.01); *G06Q 30/0276* (2013.01); *H04N 21/44222* (2013.01); *H04N 21/25891* (2013.01)
USPC .................... 725/5; 725/91; 725/93; 725/100

(58) Field of Classification Search
None
See application file for complete search history.

(56) References Cited

U.S. PATENT DOCUMENTS

| | | | | |
|---|---|---|---|---|
| 6,057,872 A | * | 5/2000 | Candelore | 725/23 |
| 2002/0129358 A1 | * | 9/2002 | Buehl et al. | 725/1 |
| 2002/0129368 A1 | * | 9/2002 | Schlack et al. | 725/46 |
| 2007/0011039 A1 | * | 1/2007 | Oddo | 705/10 |
| 2007/0088622 A1 | * | 4/2007 | Floyd | 705/26 |
| 2008/0101460 A1 | * | 5/2008 | Rodriguez | 375/240.01 |
| 2010/0146530 A1 | | 6/2010 | Bolyukh et al. | |

OTHER PUBLICATIONS

Charania, "Incorporating Sell-Up in Airline Revenue Management", Flight Transportation Laboratory, Report R98-5, (1994) 160 pages.

* cited by examiner

*Primary Examiner* — Mark D Featherstone (57) ABSTRACT

A method performed by one or more devices within a subscription television network includes receiving a customer profile for a viewer, the customer profile being based on historical data of the viewer provided over the television network. The method also includes applying, based on the customer profile, a price utility function for each on-demand program of a group of programs, the price utility function identifying dynamic pricing for each on-demand program; and offering, to the viewer over the television network, each of the programs of the group of programs at a price based on the price utility function.

20 Claims, 8 Drawing Sheets

REVENUE MANAGEMENT FOR DYNAMIC BUNDLING

BACKGROUND INFORMATION

Television service providers seek to generate maximum revenue from their products offered to consumers. In addition to content provided as part of regular subscription packages, providers may offer premium programming, such as video-on-demand (VOD) programs, to subscribers for additional charges.

VOD and/or high-definition VOD (HD-VOD) (also known as television-based VOD, on-demand television, movies-on-demand, content-on-demand, on-demand programming, VOD on the web, VOD on cable, pay-per-view (PPV), pay-as-you-go, Internet-on-demand video, entertainment-on-demand, etc.) may utilize the Internet, intranets, and/or a multitude of other networks. VOD content can be viewed using many different electronic devices, such as, telephones, personal digital assistants (PDAs), personal computers, set-top boxes (STBs), portable media devices, etc. VOD allows viewers to select video and its accompanying content, and have the video/content sent to their STB, personal computer, mobile telephone, etc. for viewing. VOD programs are typically offered to customers as individual programs or groups of programs at a fixed price.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit a subscription television service to offer bundled programming packages to customers. Bundled offerings may be adjusted dynamically based on stored viewer profiles and actual times. A video client, such as a set-top box (STB), for the subscription television service may identify particular viewer actions (e.g., programs watched, searches performed, and/or programs ordered) and provide data over a network to a server for the subscription television service. The server may assemble bundled offerings for particular viewers or groups of similarly grouped viewers that incorporate revenue management principles to maximize revenue for particular time slots.

As used herein, the term "video client" may refer to any media processing device that may receive multimedia content over a network, and may provide such multimedia content to an attached video display device (such as a television). Also, the terms "video-on-demand program," "VOD program," or "on-demand program," as used herein, may refer interchangeably to any multimedia content, such as video, music, games and/or music that can be streamed or downloaded to a video client upon request by a viewer. As used herein, the terms "VOD order" and "on-demand order" may refer to a customer request for a VOD program. Also, as used herein, the terms "viewer," "user," and "customer" may refer interchangeably to a person who interacts with, orders, views, listens to, or plays a VOD program.

Figure 1:
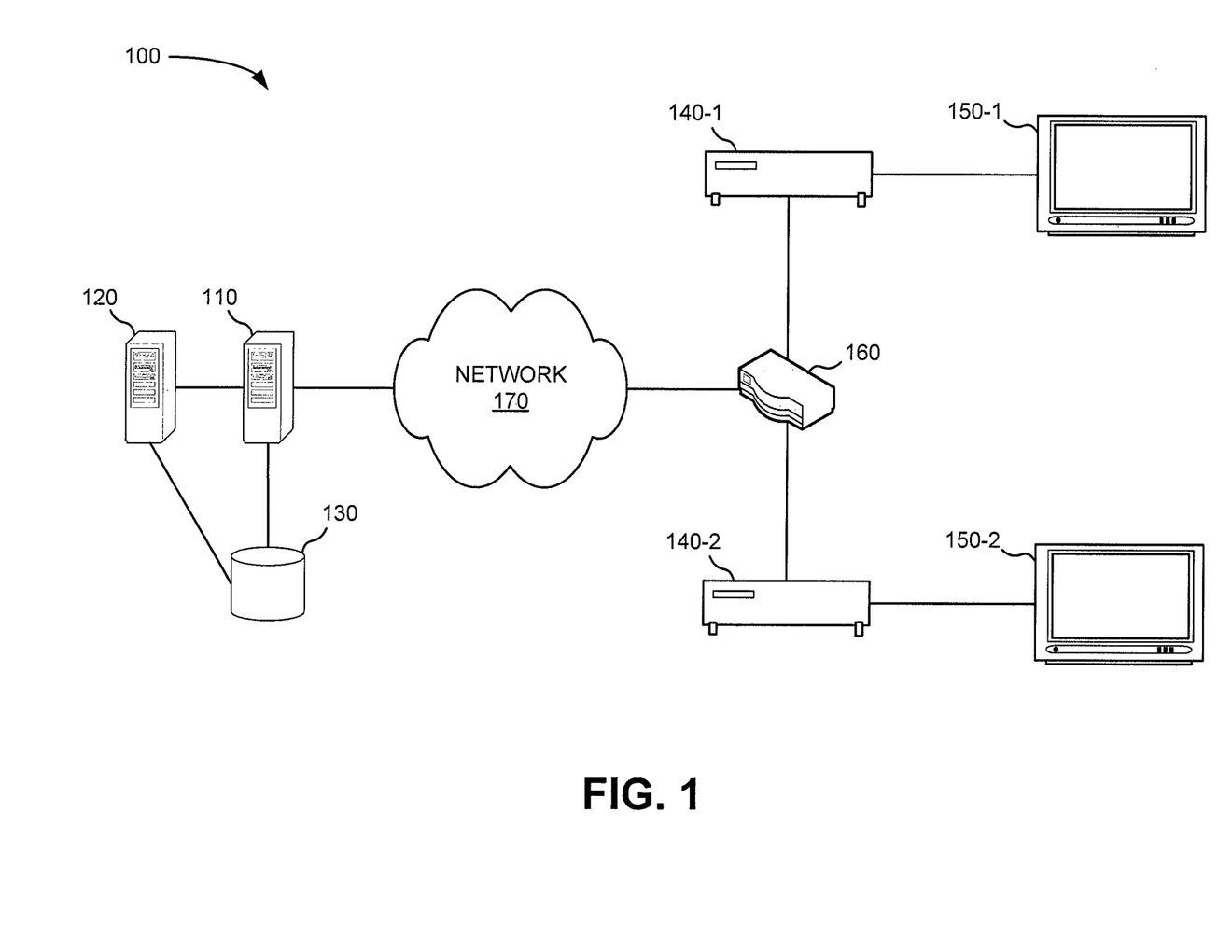
FIG. 1 depicts an exemplary network in which systems and/or methods described herein may be implemented.

FIG. 1 is a diagram of an exemplary network 100 in which systems and/or methods described herein may be implemented. As illustrated, network 100 may include a backend server 110, an analysis server 120, a database 130, video clients 140-1 and 140-2 (herein referred to collectively as "video clients 140" and generically as "video client 140"), video display devices 150-1 and 150-2 (herein referred to collectively as "video display devices 150" and generically as "video display device 150"), a local gateway 160, and a network 170. video clients 140, video display devices 150 and gateway 160 may be located on a customer's premises and be connected via network 170 to server 110 at, for example, a subscription television service provider's premises. Components of network 100 may interconnect via wired and/or wireless connections. For simplicity, a single backend server 110, analysis server 120, database 130, network 170, and local gateway 160 with two video clients 140 and two video display devices 150 have been illustrated in FIG. 1. In practice, there may be more networks, servers, local gateways, video clients, and/or video display devices. Also, in some instances, one or more of the components of network 100 may perform one or more functions described as being performed by another one or more of the components of network 100.

In general, backend server 110 may provide control over (e.g., via network 170) telecommunication services for devices, such as video display devices 150 and/or other network connectivity devices (e.g., Internet and telephone, not shown) provided at the customer's premises. As further shown in FIG. 1, backend server 110 may connect to a database 130 to store and/or retrieve customer data.

Backend server 110 may include one or more devices for providing content/information to video client 140 and/or video display device 150 in accordance with commands that are issued from video client 140. Examples of backend server 110 may include a headend device that provides broadcast television programs, a video-on-demand (VOD) device or other device that provides multimedia content upon request, and a program guide information server that provides information related to multimedia content available to video client 140. Backend server 110 may also receive information from one or more video clients, such as recorded information from video client 140 that may include viewing histories tracked by video client 140. Backend server 110 may store the information from the video clients in, for example, a database, such as database 130.

Analysis server 120 may include one or more server entities that are capable of performing statistical analysis on data stored, for example, in database 130. Analysis server 120 may retrieve data from database 130 to analyze the data and group video clients into clusters based on pattern analysis and correlation. Analysis server 120 may also determine a capacity constraint for particular video client clusters and establish a price utility function of every available program (e.g., VOD program or program segment) for that particular video client cluster. A price utility function may be an equation that establishes differential pricing based on the expected revenue through selling one more VOD program. The price utility function may generally be based on the offer price of product multiplied by the probability of a sale. In one implementation, analysis server 120 may provide price information derived from the price utility function to backend server 110 to pass on as a bundled offering to particular video clients 140 (e.g., customers associated with the video clients). While shown as two separate components in FIG. 1, in other implementations, backend server 110 and analysis server 120 may be combined as a single server or each distributed among multiple servers.

Database 130 may include one or more memory devices that maintain entries relating to subscribers' viewing histories. For example, database 130 may store information that server 110 receives from one or more video clients (e.g., video clients 140). In one implementation, database 130 may include exemplary fields, such as a user-identification field, a date field, a time field, a channel field, and/or a program identification field. While only one database is shown in FIG. 1, database 130 may consist of multiple databases stored locally at server 110 and/or stored at one or more different and possibly remote locations. Database 130 may group customers' viewing history by users and/or user groups and/or by program (e.g., to track program popularity). Database 130 may maintain additional or different information relating to programs watched, recorded, and/or ordered by viewers.

Video client 140 may include a device for selecting and/or obtaining content that may be shown or played on video display device 150. Examples of video client 140 may include a set-top box, computer, a cable card, and a portable electronic device. Video client 140 may receive a television signal from gateway 160, may convert the signal to a form usable by video display device 150, and may transmit the signal to video display device 150 for display. Video client 140 may further allow a user to alter the programming provided to video display device 150 based on a signal (e.g., a channel up or channel down signal) from, for example, a remote control (not shown). Video client 140 may also be capable of sending data to server 110. In some implementations, video client 140 may be incorporated into video display device 150, such as a television, a computer, or a portable electronic device.

In one implementation, video client 140 may track information relating to programs provided to video display device 150. In another implementation, video client 140 may track information relating to programs output to other devices (not shown), such as a video cassette recorder (VCR), a digital video recorder (DVR), an external storage device, or a remote streaming video viewing device. Video client 140 may provide some or all of the tracked program viewing/recording information to a server, such as backend server 110. Video client 140 may also obtain tracked program viewing/recording information and provide the obtained program viewing/recording information to video display device 150. Video client 140 may obtain tracked program viewing/recording information from an internal memory and/or from backend server 110.

Video display device 150 may include a digital or analog display via which a user may view VOD programs. Video display device 150 may refer to any device that can receive and display multimedia content delivered over network 170 for perception by users. Video display device 150 may include technologies such as cathode ray tube (CRT) displays, liquid crystal displays (LCDs), light-emitting diode (LED) displays, plasma displays, etc.

Gateway 160 may include a network device that provides an interface from network 170 to video display devices 150 and other network connectivity devices (not shown). For example, when telecommunication services are provided to the customer's premises via an optical fiber, gateway 160 may include an optical network terminal (ONT) that connects to the optical fiber. The ONT may convert between signals appropriate for video display device 150 and signals appropriate for transmission over optical fiber. For example, the ONT may include a coaxial cable connection that leads to video display device 150 or video client 140. The ONT may also include an Ethernet output port that connects to a personal computer or a VoIP telephone and/or a standard telephone port for connecting to a standard telephone.

Gateway 160 may include one of a number of possible gateway devices, including a satellite antenna and receiver, a coaxial cable connection, an ONT, or a broadband access for Internet Protocol TV (IPTV). The satellite antenna and receiver may provide an interface for television service broadcast from satellites. The coaxial cable connection may provide an interface for television service connected to a customer via coaxial cables. The ONT may provide an interface for an optical fiber connection. The broadband IPTV access may generally include any device that provides broadband access over which television service may be provided.

Network 170 may include a local area network (LAN), a wide area network (WAN), such as a cellular network, a satellite network, a fiber optic network, or the Internet, a private WAN, or a combination of the Internet and a private WAN, etc. that is used to transport data. Although shown as a single element in FIG. 1, network 170 may include a number of separate networks that function to provide services to devices, such as video display device 150, at a customer's premises. In one implementation, network 170 may terminate at the customer's premises via an optical communication link, such as an optical fiber provided to the customer's premises. In another possible implementation, network 170 may terminate at the customer's premises via a coaxial cable. In still another implementation, network 170 may terminate at the customer's premises via a wireless (e.g., satellite) connection.

In an exemplary implementation, video display device 150 and video client 140 may be connected through one or more audio/video (AV) devices (not shown), such as an audio/video receiver, a video amplifier, video switches, a videocassette recorder (VCR), a digital video recorder (DVR), and/or a digital video disc (DVD) players. In general, AV devices may represent any audio or video equipment that a customer installs to provide additional audio/video capabilities or to enhance the capabilities of existing equipment. Additionally, although two video clients 140 and video display devices 150 are shown in FIG. 1, any particular customer's premises may include any number of devices capable of displaying multimedia content. Further, although two video display devices for a single customer's premises are shown in FIG. 1, server 110 may interact with many customers' premises and/or their video clients and video display devices.

In implementations described herein, backend server 110 may receive viewing history data from video clients 140 and store the data in database 130. In some implementations, viewing history data (also referred to herein a "historical data") may also include customer demographics, customer responses to surveys, program guide searches, and/or other user input. The video client data may be sorted into clusters, based on, for example, common viewing tendencies. Analysis server 120 may build and/or retrieve a tendency profile for each of the clusters. A tendency profile may include predicted actions for viewers within each of the clusters. Analysis server 120 and/or backend server 110 may then establish a price utility function for every VOD program (or program segment) available to viewers within each of the clusters. Based on the established price utility function and tendency profiles, backend server 110 may direct a bundled VOD offering to video clients within the clusters. In some implementations, the bundled VOD offering may be changed as time progresses to or through, for example, a peak viewing period for a cluster.

Figure 2:
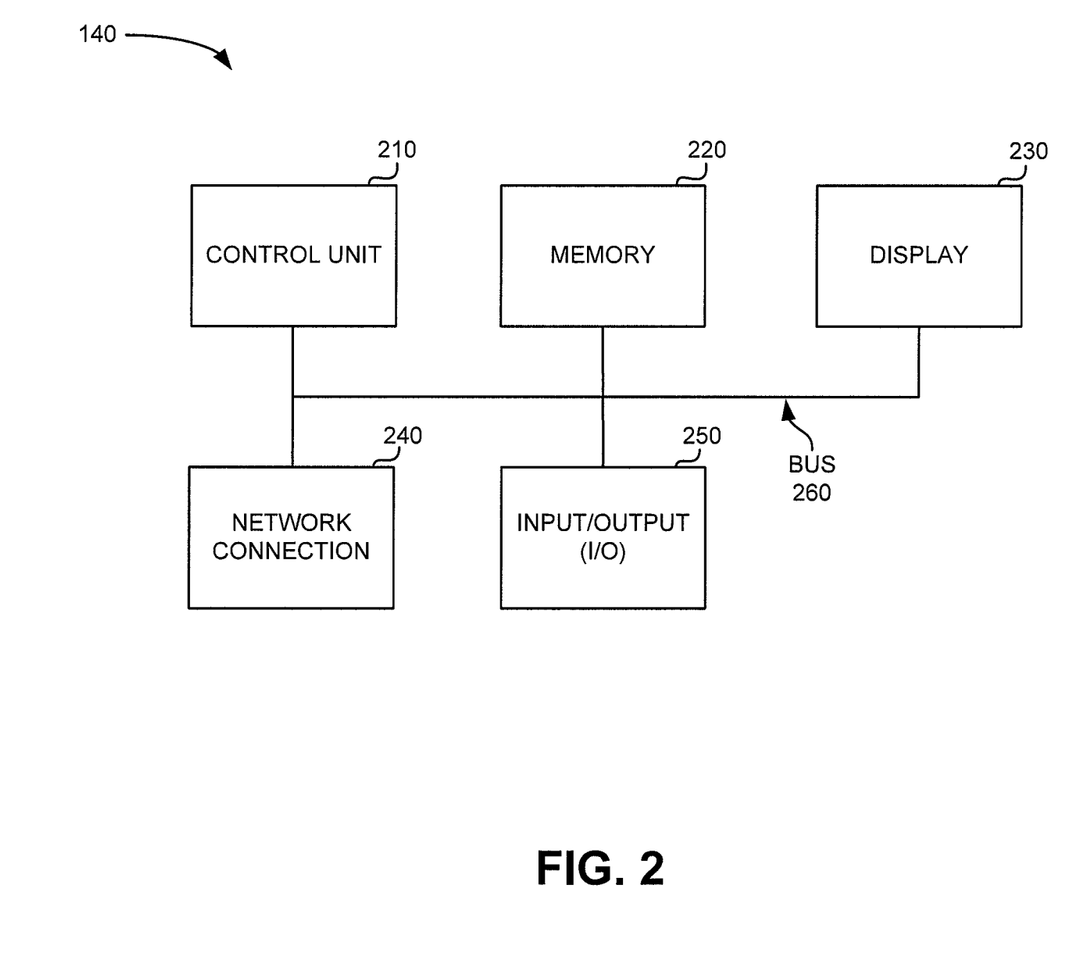
FIG. 2 is a block diagram of exemplary components of a video client that may be used in the network of FIG. 1.

FIG. 2 is diagram illustrating exemplary components of video client 140. As shown, video client 140 may include a control unit 210, a memory 220, a display 230, a network connection 240, an input/output (I/O) component 250, and a bus 260.

Control unit 210 may include a processor, microprocessor, or other type of processing logic that interprets and executes instructions. Among other functions, control unit 210 may collect and store viewer activity associated with television programming. Control unit 210 may execute instructions to send viewing history information to another device, such as backend server 110. Control unit 210 may also receive information and/or instructions from other devices, such as backend server 110.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. In one implementation, memory 220 may store viewing history information to send at a later point in time, such as when requested by backend server 110 or at a particular interval.

Display 230 may include any component capable of providing visual information. For example, in one implementation, display 230 may be a light emitting diode (LED) or a liquid crystal display (LCD). In another implementation, display 230 may use another display technology, such as a dot matrix display, etc. Display 230 may display, for example, text (such as a time, a date or a channel selection), image, and/or video information. Display 230 may be an optional component.

Network connection 240 may include any transceiver-like mechanism that enables video client 140 to communicate with other devices and/or systems. For example, network connection 240 may include an Ethernet interface, an optical interface, a coaxial interface, a radio interface, or the like. Network connection 240 may allow for wired, wireless, and/or optical communication. Network connection 240 may be configured to connect video client 140 to a packet-based IP network.

Input/output devices 250 may generally include user input devices such as external buttons and output devices such as LED indicators. With input/output devices 250, a user may generally interact with video client 140. In some implementations, input/output devices 250 may be implemented via a remote control. Bus 260 may provide an interface through which components of video client 140 can communicate with one another.

As will be described in detail below, video client 140 may perform certain operations relating to recording and communicating a history of viewer activities to a server, such as backend server 110. Video client 140 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of video client 140, in other implementations, video client 140 may include fewer, additional, different and/or differently arranged components than those depicted in FIG. 2. In still other implementations, one or more components of video client 140 may perform one or more other tasks described as being performed by one or more other components of video client 140.

Figure 3:
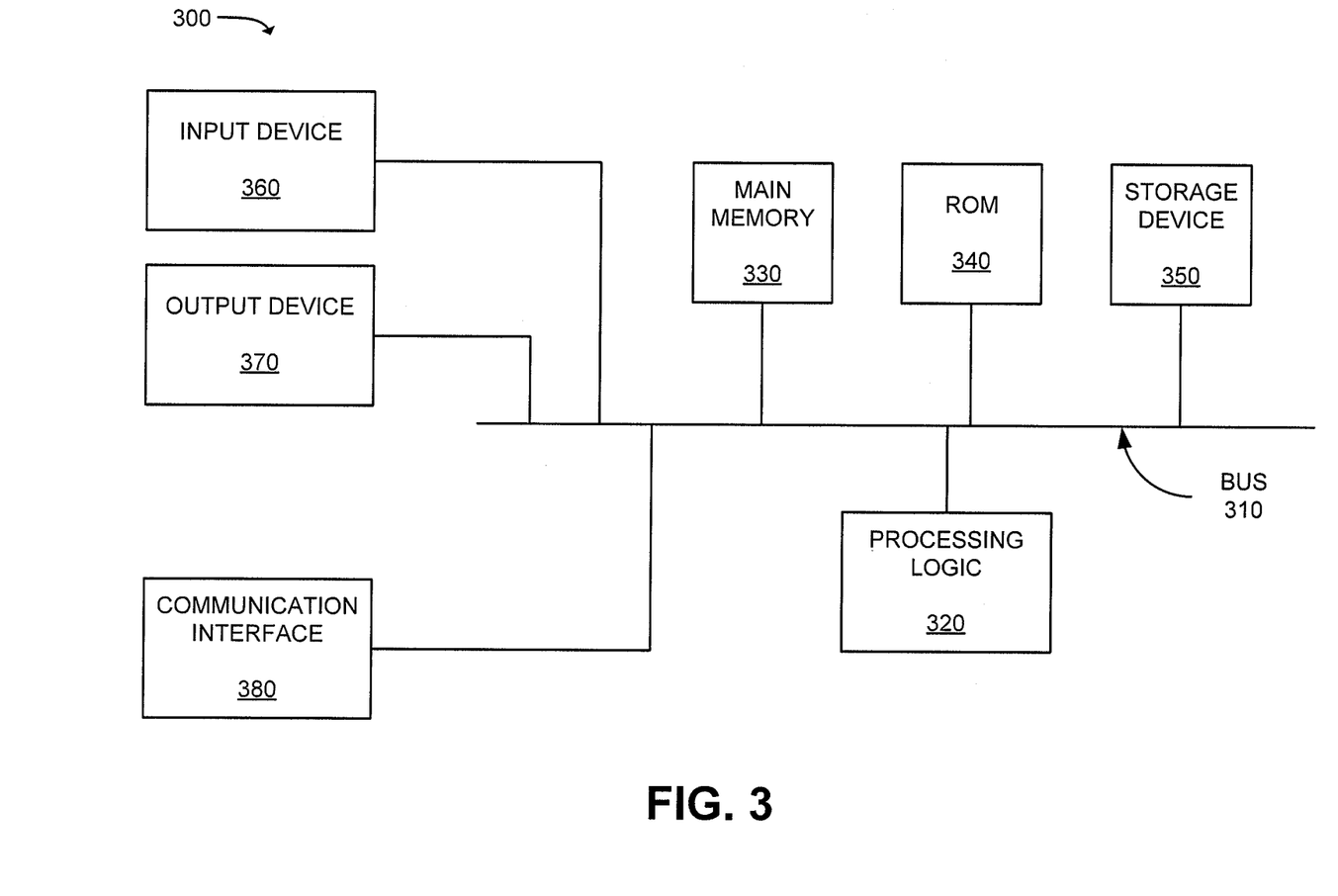
FIG. 3 is a block diagram of exemplary components of a device that may correspond to the backend server and/or analysis server of FIG. 1.

FIG. 3 is a diagram of exemplary components of a device 300 that may correspond to backend server 110 and/or analysis server 120. As illustrated, device 300 may include a bus 310, processing logic 320, a main memory 330, a read-only memory (ROM) 340, a storage device 350, an input device 360, an output device 370, and a communication interface 380.

Bus 310 may include a path that permits communication among the components of device 300. Processing logic 320 may include a processor, microprocessor, or other type of processing logic, such as an application-specific integrated circuit (ASIC), field-programmable gate array (FPGA), etc., that may interpret and execute instructions.

Main memory 330 may include a RAM or another type of dynamic storage device that stores information and instructions for execution by processing logic 320. ROM 340 may include a ROM device or another type of static storage device that may store static information and instructions for use by processing logic 320. Storage device 350 may include a magnetic and/or optical recording medium and its corresponding drive. In one implementation, storage device may include database 130. Storage device 350 may store viewer activity history for particular video clients or all video clients associated with a subscription television service provider.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems, such as video client 140.

As will be described in detail below, device 300 may perform certain operations associated with providing dynamic bundling of programming for a subscription television service. Device 300 may perform these and other operations in response to processing logic 320 executing software instructions contained in a computer-readable medium, such as main memory 330.

The software instructions may be read into main memory 330 from another computer-readable medium, such as storage device 350, or from another device via communication interface 380. The software instructions contained in main memory 330 may cause processing logic 320 to perform processes that will be described later. Alternatively, hardwired circuitry may be used in place of, or in combination with, software instructions to implement processes consistent with exemplary implementations. Thus, implementations described herein are not limited to any specific combination of hardware circuitry and software.

Although FIG. 3 illustrates exemplary components of device 300, in other implementations, device 300 may include fewer, additional, different and/or differently arranged components than those depicted in FIG. 3. In still other implementations, one or more components of device 300 may perform one or more other tasks described as being performed by one or more other components of device 300.

Figure 4:
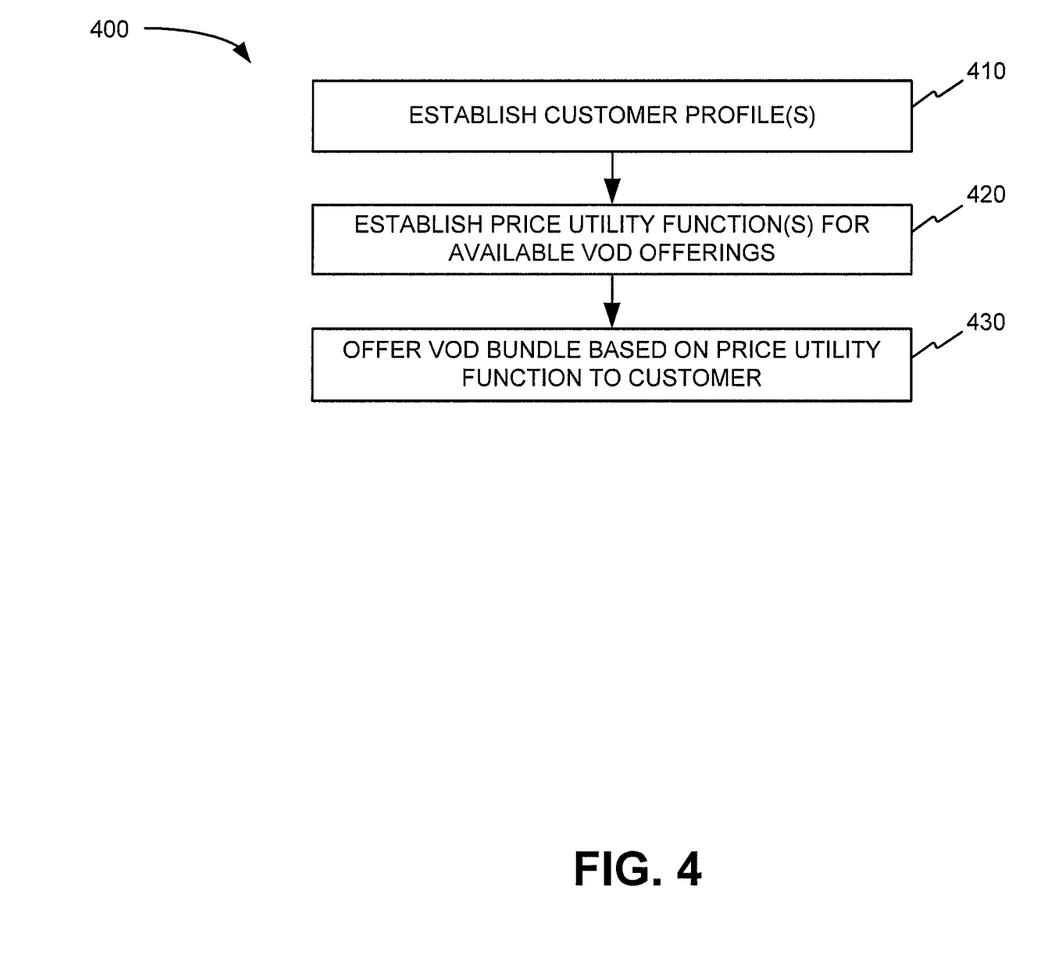
FIG. 4 is a process flow illustrating exemplary operations to offer revenue management for dynamic bundling of television programs.

FIG. 4 provides a process flow 400 illustrating exemplary operations to offer revenue management for dynamic bundling of VOD programs. The operations may be performed by one or more servers associated with a subscription television service, such as backend server 110 and/or analysis server 120.

Process 400 may begin with establishing one or more customer profiles (block 410). For example, backend server 110 may collect viewer history information from various video clients, such as video clients 140. Video clients 140 may identify particular viewer actions (e.g., programs watched, searches performed, and/or programs ordered) and provide data over a network (e.g., network 140) to a backend server 110. Backend server 110 may compile and sort the collected viewer history information locally and/or in a database, such as database 130. Analysis server 120 may determine a relevancy function based data from viewers and data collected from programming content. Analysis server 120 may identify groups of video clients 140 based on the weighted relevancy function. For example, a global group may include the tendencies of all subscriber video clients 140. Other groups (also referred to herein as "clusters") may be identified within the global group. For example, certain groupings may become apparent based on types of weighted action objects and/or viewing times from each video client 140 viewer history.

Once a group is defined, analysis server 120 may indicate viewing tendencies for that particular group. A tendency profile may include predicted actions for viewers within the cluster. For example, some clusters may have a viewing history that includes high VOD usage during a consistent weekly time slot (e.g., Saturdays from 1-5 pm). Clusters may also be discriminated based on viewed content type within a time period. For example, a viewing history may be dominated by family movies and educational programs during one time period (e.g., Saturday afternoons) and dominated by romantic comedy movies at another time period (e.g., Saturday nights). Other patterns may be identified, including times of peak use within a cluster, types of programming associated with a cluster, preferred channels, programming variations between timeslots, etc. These patterns may be used to determine tendencies for particular clusters.

Backend server 110 may assign and send one or more cluster identifiers to video client 140. A cluster identifier may be a character string and/or number that identifies a cluster. Video client 140 may store the cluster identifiers and include them in messages to backend server 110. In an exemplary implementation, each video client 140 may be assigned to a hierarchy of groupings including a global grouping, one or more clusters, and an individual video client. Thus, video client 140 may store more than one cluster identifier.

One or more price utility functions for available VOD offerings may be established (block 420). For example, analysis server 120 may establish a price utility function for every available VOD (or VOD segment) to a specific cluster. In one implementation, analysis server 120 may apply a capacity/inventory constraint analysis to a particular cluster. The inventory for such an analysis may be considered unlimited, based on the service provider's ability to simultaneously distribute VOD programming to any anticipated amount of customers. The constraint for the analysis may be the capacity of the viewer(s) within a particular cluster to view VOD programming during a time period. The estimate of these finite viewing times may be based on, for example, viewer profile(s) for the applicable cluster. Establishing a price utility function is described further with respect to FIG. 5.

Figure 5:
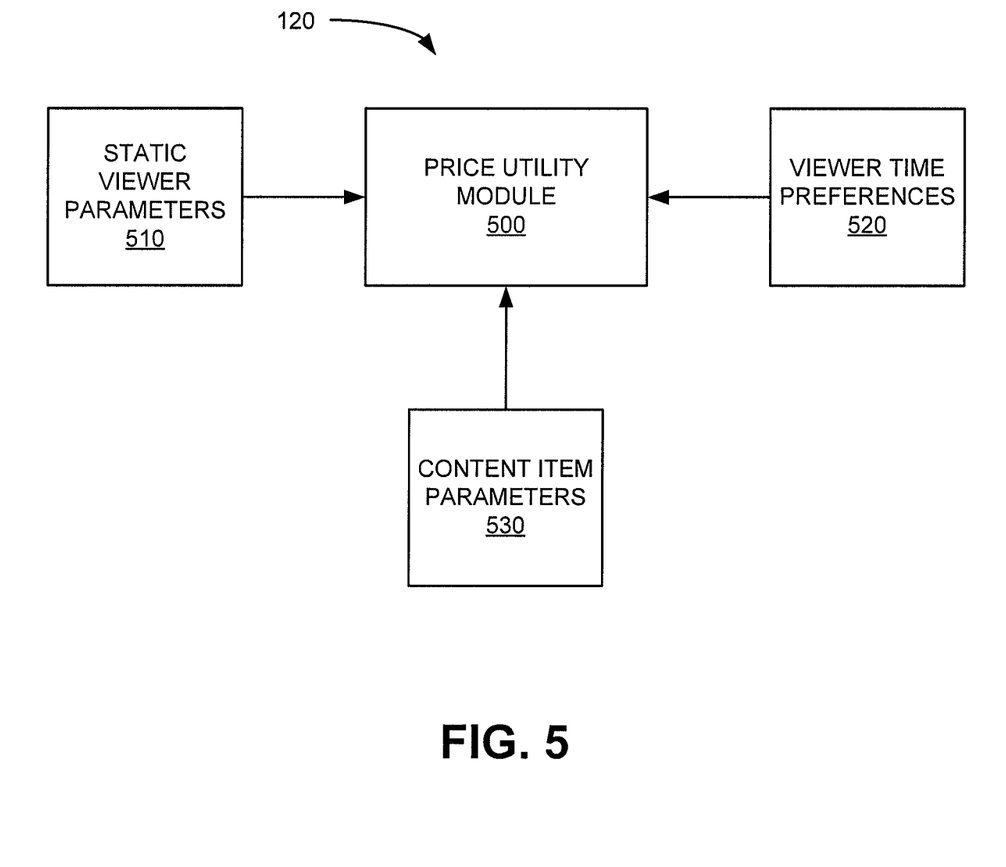
FIG. 5 is a diagram of exemplary factors of a price utility for a television program.

FIG. 5 is a diagram of exemplary information used for establishing a price utility function for a VOD program. A price utility module 500 (included, for example, within analysis sever 120) may incorporate static viewer parameters 510, viewer time preferences 520, and content item parameters 530 to derive the price utility of an available VOD offering. Each of the static viewer parameters 510, viewer time preferences 520, and content item parameters 530 may be retrieved from, for example, database 130.

Static viewer parameters 510 may include parameters derived preferences for particular content within a cluster. For example, a cluster of viewers may demonstrate certain genre preferences (e.g., action, romance, sports, comedy, drama, etc.) or other types of content classifications. For example, viewers within a cluster may prefer action movies over drama. As another example, viewers within the cluster may prefer programs with certain content ratings (e.g., ratings from the Motion Picture Association of America (MPAA), Television Parental Guidelines system, and the like), while excluding programs with other content ratings.

Time preferences 520 may include parameters derived from viewer tendencies. For example, viewer tendencies within a cluster may indicate that most VOD programs are watched on weekends between 12:00 PM and 6:00 PM, while VOD programs may rarely be watched on Friday nights. Furthermore, viewer tendencies may indicate certain genres are watched mostly during certain time periods.

Content item parameters 530 may include factors related to the particular VOD offering, such as the program genre, content ratings, the applicable licensing fees paid to third parties, the length of the program, the program popularity, etc. Price utility module 500 may apply static parameters 510, time preferences 520, and content item parameters 530 to identify dynamic pricing for VOD programs. For example, price utility module 500 may determine a price utility function so that viewers within the cluster are incentivized to purchase a particular VOD program. In an exemplary implementation, the VOD program may be offered at a varying discount to viewers such that the marginal revenue through the incremental sale of the VOD program will be higher than the cost of providing the VOD program.

Returning to FIG. 4, a VOD bundle may be offered to customer (block 430). For example, based on the cluster association of a particular video client, the subscription television service (e.g., backend server 110) may distribute a particular VOD bundle offer to individual video clients. The VOD bundle offer may include variable pricing for a set of VOD programs based on the price utility function for each VOD program. Offering a VOD bundle is described further with respect to FIG. 6.

Figure 6:
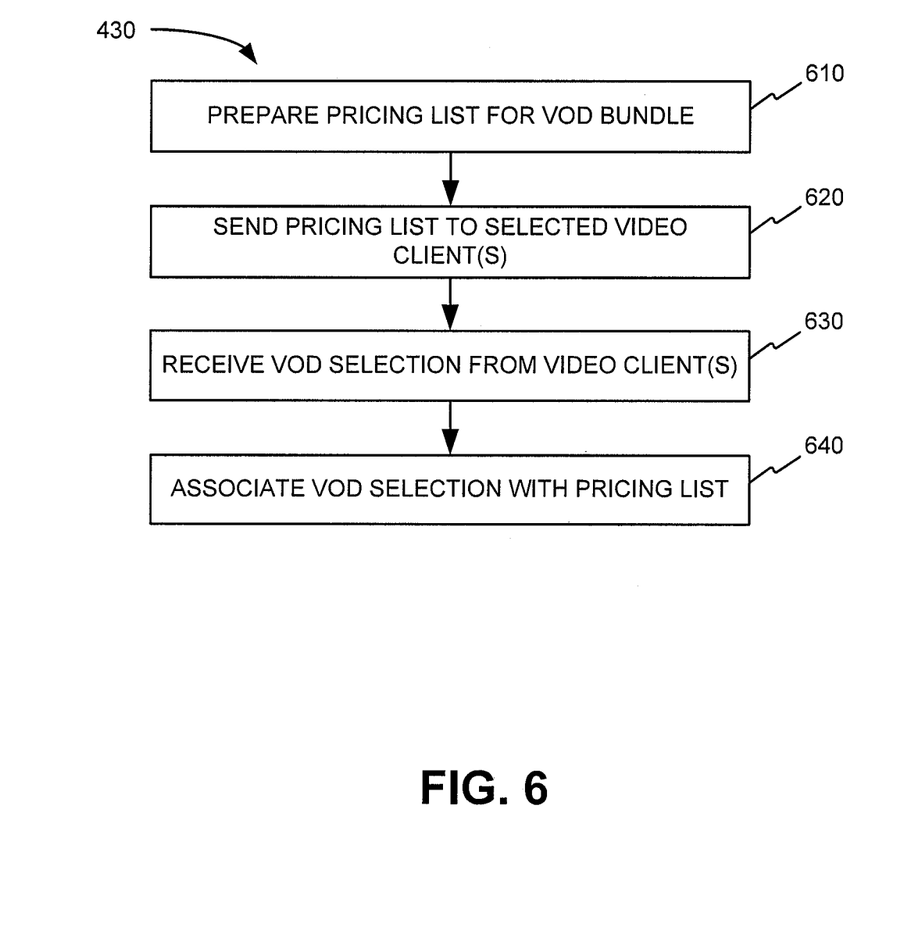
FIG. 6 is a process flow illustrating exemplary operations for offering a television program bundle to a customer of FIG. 4.

FIG. 6 provides a process flow illustrating exemplary operations of block 430 of FIG. 4 for offering a VOD program to a customer. The process may be performed by, for example, backend server 110 in conjunction with analysis server 120 and/or video client 140.

A pricing list for a VOD bundle may be prepared (block 610). For example, based on the price utility function for each available VOD, backend server 110 and/or analysis server 120 may prepare a pricing list for each program in the VOD bundle. The pricing list may be specific to a cluster or customer associated with a particular profile. The pricing list may include, for example, prices for VOD programs that are available for a limited time or during a particular time period.

The pricing list may be sent to select video clients (block 620). For example, backend server 110 may send to the pricing list to video clients 140 associated with the cluster or customer profile. The pricing list may be received by each video client 140 and integrated into a template, for example, when a viewer tunes to a VOD selection screen (e.g., a VOD poster screen) on video display device 150. In some implementations, the pricing may be integrated into a traditional VOD selection screen (e.g., the VOD selection screen appears as a typical VOD selection view except that the price of the VOD offering may be different). In other implementations, a traditional VOD selection screen may be modified to include other information that indicates a limited duration for the pricing. In still other implementations, a separate dedicated VOD selection screen may be used to present information from the pricing list to the customer. In still other implementations, VOD pricing may be integrated into listings shown on an electronic program guide. A combination of pricing indications may also be used. For example, customers may be able to select one or more ways that pricing information may be presented.

In another implementation, the actual price utility function for each of the programs in the VOD bundle may be provided to video clients 140, so that each video client 140 may calculate the variable VOD pricing without the use of a price list. The calculated pricing may be displayed to the viewer in the same manner as when derived from a price list, as described above.

A VOD selection may be received from one or more video clients (block 630). For example, backend server 110 may receive a VOD selection from a video client 140. In one implementation, a viewer within a particular cluster may select a VOD offering. The selection may be communicated to the video client 140 (e.g., via a remote control), and the video client 140 may, in turn, send a request to backend server 1 10. The request from the video client 140 may include, for example, information indicating the cluster with which the video client 140 is associated.

The VOD selection may be associated with the VOD pricing list (block 640). For example, backend server 110 may associate the VOD request received from video client 140 with the VOD pricing list for the cluster. In one implementation, the VOD request may be associated with the pricing list based on, for example, the cluster identification and the selection time identified by the video client 140. In other implementations, the VOD request may include pricing information in the request.

Figure 7A:
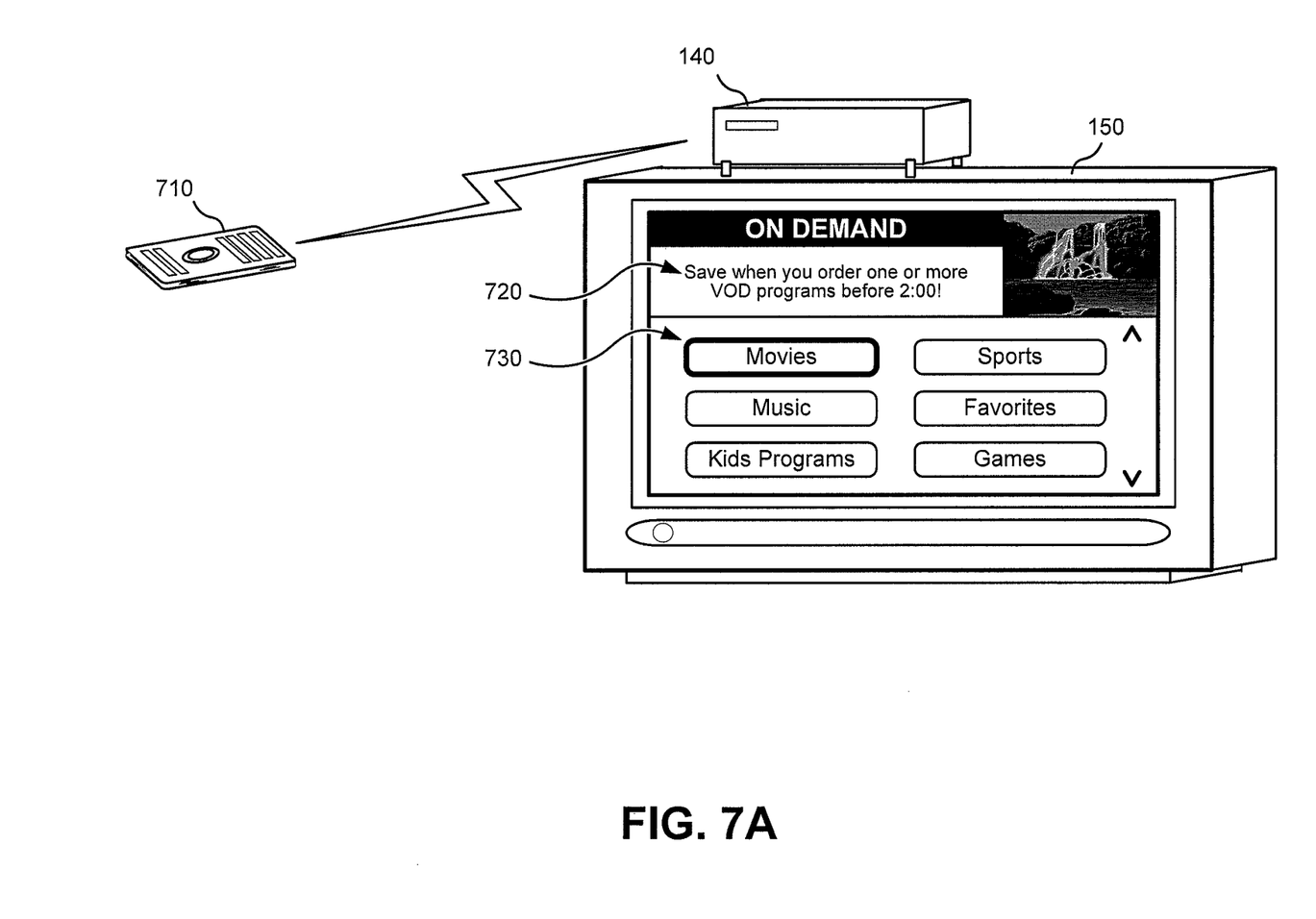
FIGS. 7A and 7B are exemplary diagrams illustrating implementations of a customer interface for revenue management for dynamic bundling.
Figure 7B:
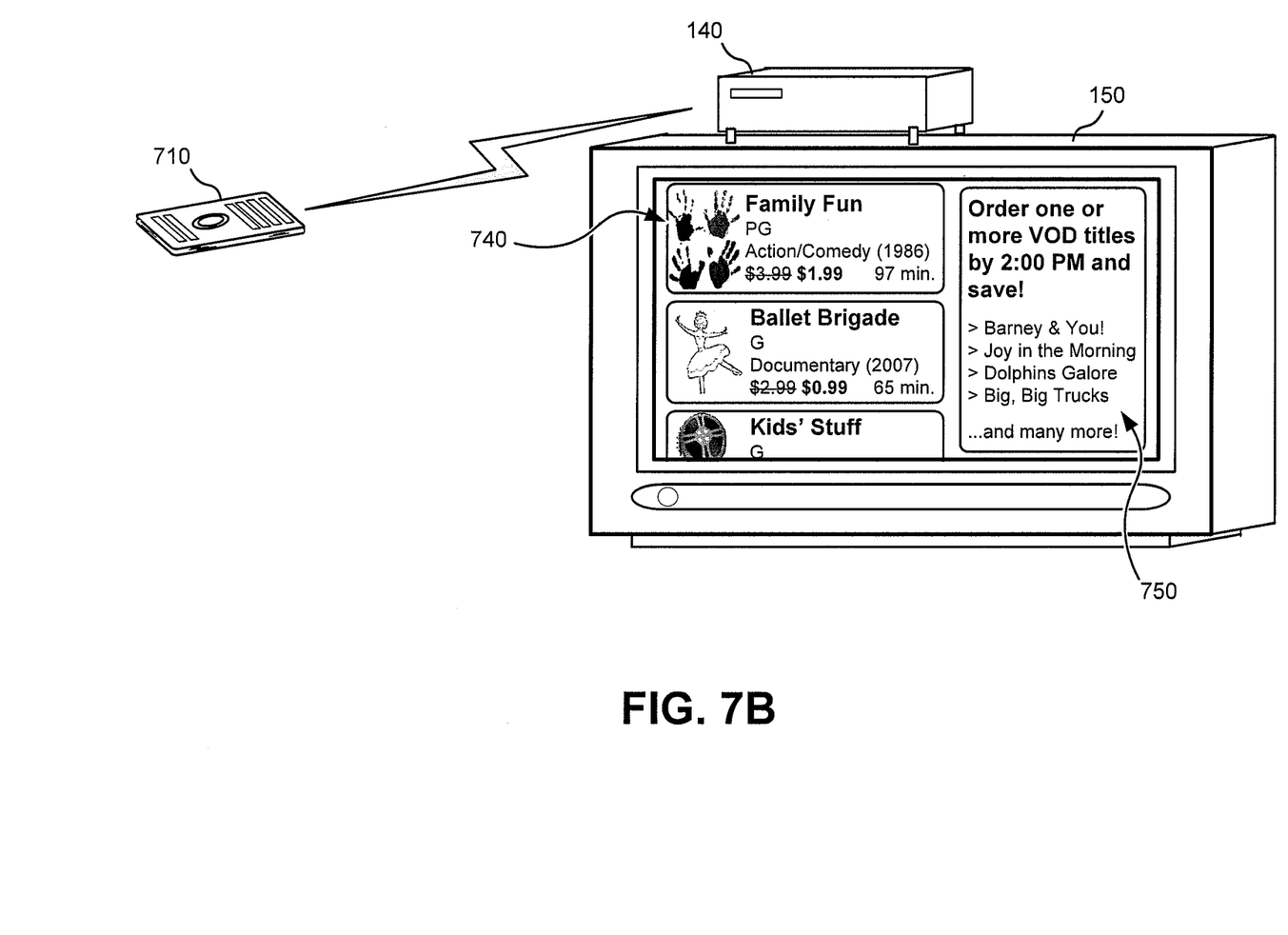

FIGS. 7A and 7B provide exemplary diagrams illustrating an implementation of a customer interface for revenue management for dynamic bundling according to systems and/or methods described herein. More specifically, FIG. 7A provides an exemplary diagram of a user interface for viewing VOD programming options and receiving a VOD bundling notification and FIG. 7B provides an exemplary diagram of a VOD selection screen in accordance with the selection shown in FIG. 7A.

Referring to FIG. 7A, a viewer may elect to view a VOD selection screen on video display device 150. The viewer may select the VOD selection screen, for example, by pressing a designated button on a remote control, such as remote control 710, or tuning to a designated channel for a VOD selection screen. The VOD selection screen may include a notice, such as notice 720 displayed on video display device 150 of FIG. 7A, that discounts on VOD purchases are available (e.g., either for a limited time period or for selected programs). In one implementation (not shown), notice 720 may include a link to a list of particular titles best matching a viewer's profile (e.g., based on the designated cluster of the video client). The viewer may select (e.g., via remote control 710) the link from the notice 720 or a category of VOD programming from a menu, such as the menu 730 displayed on video display device 150. For example, the viewer may select VOD options such as "Movies," "Sports," "Music," "Favorites," "Kids Programs," "Games," etc.

Menu 730 may also include sub-menus for one or more options. Sub-menus may be implemented, for example, as drop-down menus within menu 730 (not shown) or as separately displayed sub-menus. For example, selecting the "Movies" menu selection shown in FIG. 7A may cause a sub-menu 740 of FIG. 7B to be displayed.

Sub-menu 740 may allow a viewer to select from available VOD programming, including programs that have been discounted based on the price list provided to particular video clients 140 within a cluster. Sub-menu 740 may also provide a menu item 750 that presents a user with information regarding restrictions (e.g., time limits) for the discounts and/or presents a user with particular titles most compatible with the cluster profile for the current time.

The illustrations of FIGS. 7A and 7B are exemplary formats for soliciting additional revenue for paid programming. Other formats may be used. Additionally and/or alternatively, a viewer may be informed of discounted VOD programming rates through advertising on other channels (e.g., on an electronic program guide), overlaid windows, data scrolls, and/or start-up screens.

Systems and/or methods described herein may be implemented by one or more computing devices within a subscription television network. The computing devices may receive a customer profile for a viewer, where the customer profile is based on historical television viewing data of the viewer provided over the television network. Based on the customer profile, a price utility function may be applied to each program of a group of programs. The programs may then be offered as a dynamically-priced bundle to the viewer.

The dynamically-priced bundle may be offered to a customer to maximize the utility or generate maximum expected marginal revenue. Cluster profile information may be used to identify preferred time periods/programming types for certain viewers (e.g., a peak VOD use period of 1:00-5:00 pm every Saturday, or a capacity is 4 hours every Saturday). The customer may be offered a discount on VOD programming such that the marginal revenue through incremental sales is higher than the cost. Once the preferred time period for a customer in the cluster elapses without a VOD purchase, the programming provider has lost that capacity of making a sale in that time window forever. Thus, implementations described herein increase the probability that the programming provider may make some incremental revenue, instead of nothing, as long as the offered price is higher than cost.

The foregoing description provides illustration and description, but is not intended to be exhaustive or to limit the implementations to the precise form disclosed. Modifications and variations are possible in light of the above teachings or may be acquired from practice of systems and/or methods disclosed herein.

Also, while series of blocks have been described with regard to the flowchart of FIGS. 4 and 6, the order of the blocks may differ in other implementations. Further, non-dependent acts may be performed in parallel.

It will be apparent that implementations, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code-it being understood that software and control hardware may be designed to implement the embodiments based on the description herein.

Further, certain implementations described herein may be implemented as "logic" that performs one or more functions. This logic may include hardware-such as a processor, microprocessor, an application specific integrated circuit or a field programmable gate array—or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method performed by one or more devices within a subscription television network, the method comprising:
   receiving a customer profile for a viewer, the customer profile being based on historical data of the viewer provided over the television network;
   assigning the customer profile to one or more clusters based on at least one of weighted actions or one or more viewing times associated with the historical data, where each of the one or more clusters includes a plurality of customer profiles;
   determining one or more preferences of the one or more clusters based on activity associated with each of the plurality of customer profiles of the one or more clusters;
   applying, based on the historical data of the one or more preferences of the one or more clusters, a price utility function for each on-demand program of a group of programs, the price utility function identifying dynamic pricing for each on-demand program; and
   offering, to the viewer over the television network, each of the programs of the group of programs at a price based on the price utility function.

2. The method of claim 1, where the customer profile for the viewer includes:
   projected viewing tendencies of the one or more clusters.

3. The method of claim 1, where the price utility function includes:
   one or more static parameters derived from genre preferences within the customer profile; and
   one or more time preference parameters for on-demand viewing within the customer profile.

4. The method of claim 1, where offering each of the programs of the group of programs includes:
   preparing a pricing list of each of the programs of the group of programs, where the pricing list is based on the price utility function; and
   sending the pricing list to a video client associated with the customer profile.

5. The method of claim 1, further comprising:
   receiving a request, from a video client, for one of the programs; and
   providing, to the video client, the requested program.

6. The method of claim 1, where the programs are video-on-demand (VOD) programs.

7. The method of claim 1, where offering each of the programs of the group of programs includes:
   sending the price utility function to a video client associated with the customer profile.

8. The method of claim 1, where offering each of the programs of the group of programs includes:
   sending instructions to a video client associated with the customer profile, where the instructions notify the video client to indicate discounted pricing on a video-on-demand (VOD) poster view, an electronic program guide, or a start-up screen.

9. The method of claim 2, where the projected viewing tendencies include peak time periods of on-demand orders.

10. A system, comprising:
    a memory to store instructions; and
    a processor to execute the instructions to:
      receive a customer profile of a viewer, where the customer profile is based on historical data of the viewer,
      assign the customer profile to one or more clusters based on at least one of weighted actions or one or more viewing times associated with the historical data, where each of the one or more clusters includes a plurality of customer profiles;
      determine one or more preferences of the one or more clusters based on activity associated with each of the plurality of customer profiles of the one or more clusters;
      generate a price utility function based on historical data of the one or more preferences of the one or more clusters, the price utility function identifying price information for each program of a group of programs at different times, and
      send, to a video client associated with the viewer, the price information.

11. The system of claim 10, where the price information includes:
    a time-oriented pricing list of each of the programs of the group of programs; or the price utility function.

12. The system of claim 10, where the customer profile includes:
    viewing tendencies of the two or more viewers.

13. The system of claim 10, where the price utility function includes:
    one or more static parameters derived from genre preferences within the customer profile; and one or more time preference parameters within the customer profile.

14. The system of claim 10, where the processor is further to execute instructions to:
receive an order, from a video client, for one of the programs; and
provide, to the video client, the requested program.

15. The system of claim 10, where the programs are video-on-demand (VOD) programs.

16. The system of claim 12, where the viewing tendencies include time periods of on-demand orders.

17. A method implemented at a video client, the method comprising:
receiving, from a server, on-demand pricing information, the on-demand pricing information including different prices for programs within a group of programs based on a price utility function, where
the video client is associated with a customer profile,
the customer profile is assigned to one or more clusters based on at least one of weighted actions or one or more viewing times associated with historical data of the video client, where each of the one or more clusters includes a plurality of customer profiles,
one or more preferences of the one or more clusters are determined based on activity associated with each of the plurality of customer profiles of the one or more clusters, and
the price utility function is based on the historical data of one or more preferences of the one or more clusters;
presenting, to a display device, the pricing information associated with a current time;
receiving, from a viewer, an order request for one of the programs; and
sending, to the server, the order request.

18. The method of claim 17, where the presenting the pricing information associated with a current time comprises presenting the pricing information within a VOD poster view, an electronic program guide, or a start-up screen.

19. A non-transitory computer-readable medium storing instructions, the instructions comprising:
one or more instructions which, when executed by at least one processor, cause the at least one processor to assign a customer profile of a viewer to one or more clusters based on at least one of weighted actions or one or more viewing times associated with historical data of the viewer, where each of the one or more clusters includes a plurality of customer profiles;
one or more instructions which, when executed by the at least one processor, cause the at least one processor to determine one or more preferences of the one or more clusters based on activity associated with each of the plurality of customer profiles of the one or more clusters;
one or more instructions which, when executed by the at least one processor, cause the at least one processor to generate a price utility function based on historical data of the one or more preferences of the one or more clusters, the customer profile including television viewing tendencies;
one or more instructions which, when executed by the at least one processor, cause the at least one processor to generate, based on the price utility function, price information for each program of a group of programs at different times; and
one or more instructions which, when executed by the at least one processor, cause the at least one processor to send the price information to a video client associated with the customer profile.

20. The medium of claim 19, where the price utility function comprises:
one or more static parameters derived from genre preferences within the customer profile; and
one or more time preference parameters within the customer profile.

* * * * *